(12) United States Patent
Hiltermann

(10) Patent No.: US 11,360,549 B2
(45) Date of Patent: Jun. 14, 2022

(54) AUGMENTED REALITY DOLL

(71) Applicant: Sean Hiltermann, South Croydon (GB)

(72) Inventor: Sean Hiltermann, South Croydon (GB)

(*) Notice: Subject to any disclaimer, the term of this patent is extended or adjusted under 35 U.S.C. 154(b) by 0 days.

(21) Appl. No.: 17/269,018

(22) PCT Filed: Aug. 19, 2019

(86) PCT No.: PCT/GB2019/000120
§ 371 (c)(1),
(2) Date: Feb. 17, 2021

(87) PCT Pub. No.: WO2020/035650
PCT Pub. Date: Feb. 20, 2020

(65) Prior Publication Data
US 2021/0318747 A1 Oct. 14, 2021

(30) Foreign Application Priority Data

Aug. 17, 2018 (GB) .................... 1813450

(51) Int. Cl.
*G06V 10/56* (2022.01)
*G06V 20/20* (2022.01)
(Continued)

(52) U.S. Cl.
CPC .......... *G06F 3/011* (2013.01); *G02B 27/0101* (2013.01); *G02B 27/017* (2013.01);
(Continued)

(58) Field of Classification Search
CPC ... G06F 3/011; G06T 19/006; G06K 9/00201; G06K 9/4652; G06K 9/00671; G02B 27/017; G02B 27/0101; G02B 2027/0138
See application file for complete search history.

(56) References Cited

U.S. PATENT DOCUMENTS

| 10,373,342 | B1* | 8/2019 | Perez, III | G06T 7/97 |
| 2007/0225553 | A1* | 9/2007 | Shahidi | A61B 8/12 |
| | | | | 600/103 |

(Continued)

FOREIGN PATENT DOCUMENTS

| EP | 2443620 A2 | 4/2012 |
| EP | 3298479 A1 | 3/2018 |

(Continued)

OTHER PUBLICATIONS

ISR for PCT/GB2019/000120 (dated Dec. 20, 2019).
Written Opinion from ISA/EP for PCT/GB2019/000120 (dated Dec. 20, 2019).

*Primary Examiner* — Jitesh Patel

(57) ABSTRACT

A system and method for augmenting the visual representation of a visualized object with a different overlaid visualization in a seamless lifelike manner, comprising: means arranged to provide information on the location and motion of each movable part of the object; image acquisition means arranged to acquire images and video of the object; processing means arranged to calculate three dimensional distance and position of the movable parts and of the object; image processing means arranged to generate an overlay image into the same space as the object; display means to display the overlaid image. The system may be self-contained in a smartphone based Virtual Reality headset.

5 Claims, 4 Drawing Sheets

(51) Int. Cl.
*G06V 20/64* (2022.01)
*G06F 3/01* (2006.01)
*G02B 27/01* (2006.01)
*G06T 19/00* (2011.01)

(52) U.S. Cl.
CPC ............ *G06T 19/006* (2013.01); *G06V 10/56* (2022.01); *G06V 20/20* (2022.01); *G06V 20/64* (2022.01); *G02B 2027/0138* (2013.01)

(56) References Cited

U.S. PATENT DOCUMENTS

| | | | |
|---|---|---|---|
| 2012/0139907 A1* | 6/2012 | Lee | G06T 19/00 345/419 |
| 2016/0019016 A1* | 1/2016 | Koch | G06T 19/006 345/633 |
| 2016/0054837 A1 | 2/2016 | Stafford | |
| 2017/0188980 A1* | 7/2017 | Ash | A61B 5/1071 |
| 2018/0158196 A1* | 6/2018 | Marks | G06T 7/248 |
| 2020/0330873 A1* | 10/2020 | Keefe | A63F 13/843 |

FOREIGN PATENT DOCUMENTS

| | | |
|---|---|---|
| GB | 2466714 A | 7/2010 |
| WO | 2006/115261 A1 | 11/2006 |
| WO | 2012/160055 A1 | 11/2012 |

\* cited by examiner

AUGMENTED REALITY DOLL

FIELD OF THE INVENTION

This invention relates to system and method that augments or changes, swaps the visual representation and perception of a human or that of an inanimate object with a different visualisation in a seamless life like manner. More specifically the invention uses image and video capturing, processing and display, as well as a virtual reality representation.

BACKGROUND TO THE INVENTION

Virtual Reality (VR) and Augmented Reality (AR) offer the possibility of visually immersing users in virtually other worlds. However, their limitation is that they offer only visual stimulation.

The inventor herewith presents an invention that connects the virtual visual world to the physical tactile environment close to them.

SUMMARY OF THE INVENTION

According to a first aspect of the invention there is provided a system for augmenting the visual representation of a visualised object with a different overlaid visualisation in a seamless lifelike manner, comprising:
  means arranged to provide information on the location and motion of each movable part of the object;
  image acquisition means arranged to acquire images and video of the object;
  processing means arranged to calculate three dimensional distance and position of the movable parts and of the object;
  image processing means arranged to generate an overlay image into the same space as the object;
  display means to display the overlaid image.
  Wherein the means may be arranged to provide information on the location and motion of each movable part of the object are markers with different appearances or colours to each movable part of the object;
    wherein image acquisition means may be arranged to acquire images and video of the object with markers.
  Wherein the object may be covered in a bodysuit.
  In a further embodiment the system, the means may be arranged to provide information on the location and motion of each movable part of the object are inertial measurement units embedded inside each movable part of the object;
    wherein the image acquisition means may be arranged to acquire images and video of the object and of its movable parts.
  In a further embodiment the system, the means may be arranged to provide information on the location and motion of each movable part of the object are rotary encoders arranged to acquire the angle of each movable part embedded inside each movable part of the object;
    wherein the image acquisition means may be arranged to acquire images and video of the object and of its movable parts.
  In a further embodiment the system, the means may be arranged to provide information on the location and motion of each movable part of the object are based on chroma key methodology,
    wherein the image acquisition means may be arranged to acquire images and video of the object and of its movable parts;

and the image is post-processed to replace a particular colour with a predefined visual feature.

In a further embodiment the system, wherein the processing, image acquisition and displaying may be performed with a smartphone based Virtual Reality headset.

The object may be a toy.

The object may be object may an adults' doll.

The bodysuit may be arranged to be suitable and wearable for a human.

A further embodiment of the invention presents a method for augmenting the visual representation of a human or of an inanimate object with a different overlaid visualisation in a seamless lifelike manner, comprising the system of claims 1 to 11.

BRIEF DESCRIPTION OF THE DRAWINGS

The invention will now be described by way of example only with reference to the accompanying drawings in which.

DETAILED DESCRIPTION OF THE INVENTION

Below are presented embodiments and methods of achieving the invention:

1. Children's Toy

The invention presents a toy, such as a doll, modified or added on to with the goal of being overlaid with a 3D computer generated model of similar proportions or effect in a virtual reality (VR) or augmented reality (AR) environment. The overlay model is so closely aligned with the physical toy that the user is able to feel the sensation of touching the overlay model. Essentially the overlay model or effect occupies the same space in the virtual reality/augmented reality environment that the physical toy does in the real world. It is possible to attach computer generated effects to the toys such as flames or goo, which is visible in virtual reality/augmented reality, without there actually being any flames or goo in the physical world. A usage example for this is standard "tanks and army men" toys having virtual fire emitted from the tip of their guns to simulate gunshots.

Figure 1:
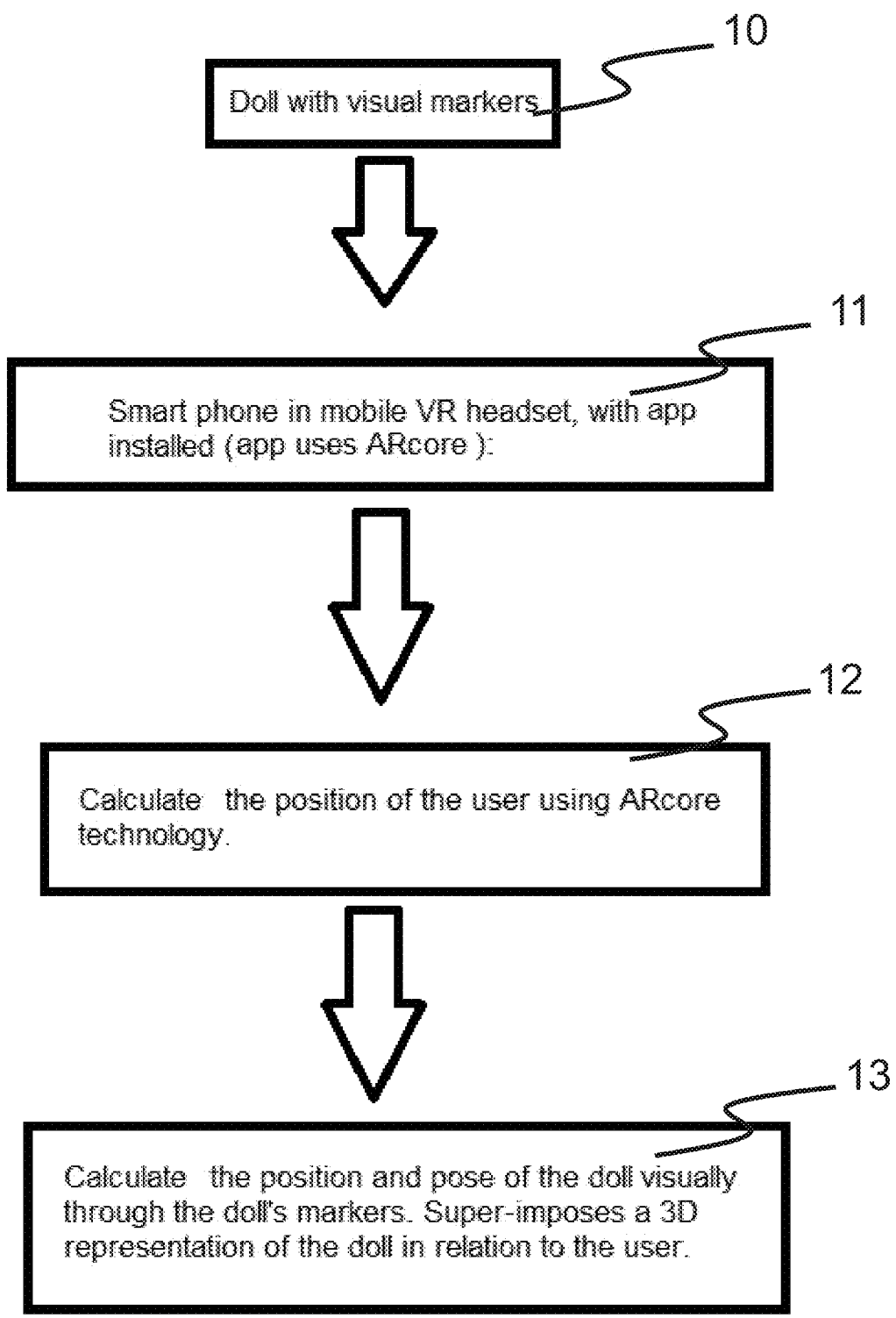
FIG. 1 shows a dataflow diagram of a system in accordance with an embodiment of the invention that employs visual markers.

A first aspect of the invention is achieved with optical markers. Referring to FIG. 1, various markers with different appearances or colours are attached to each movable part of a toy, e.g. of a doll. The VR headset can be a smartphone VR headset with embedded cameras with which to acquire the optical markers on the toy (10). A smart device application (App) is installed on the smartphone (11). The smartphone app displays the computer-generated overlay and uses the image acquired by the camera feed to perform calculations for positioning the computer-generated overlay into the same space as the toy (12). Each movable part of the toy has different markers. When the smartphone's camera detects a marker denoting for example the loader of a toy bulldozer, the smartphone app will position a computer generated overlay of dirt and dust falling, into the position of the physical toy's loader to make it appear that the toy bulldozer's loader is overflowing with dirt. Calculations are done with the angle of the marker and the distance it is from the camera to achieve this positioning. Calculate the position and pose of the toy and superimpose a 3D representation of the toy in relation to the user (13).

This is done with every marker detected on the camera feed to position each corresponding moveable part of the computer-generated overlay. Measure distance and angle from the user. For example, if the toy bulldozer's loader is 2 m from the camera and at a 30-degree angle, then the computer-generated overlay is positioned at 2 m from the user and at a 30-degree angle in virtual reality/augmented reality space. The app also displays the computer-generated overlay and also does the calculations.

A second aspect of the invention is achieved with inertial measurement unit (IMU).

Figure 2:
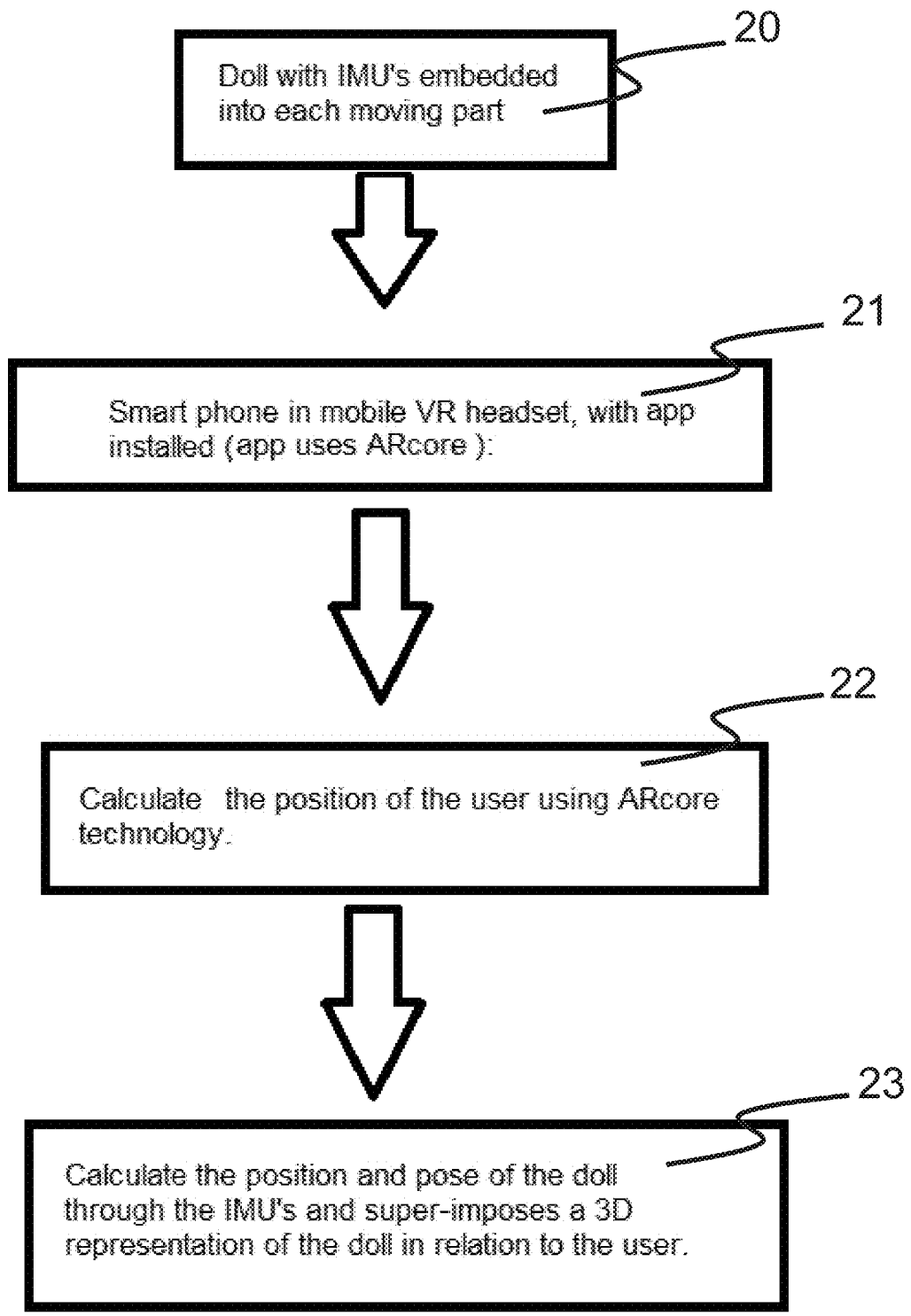
FIG. 2 shows a dataflow diagram of a system in accordance with an embodiment of the invention that employs inertial measurement units (IMU)
Figure 3:
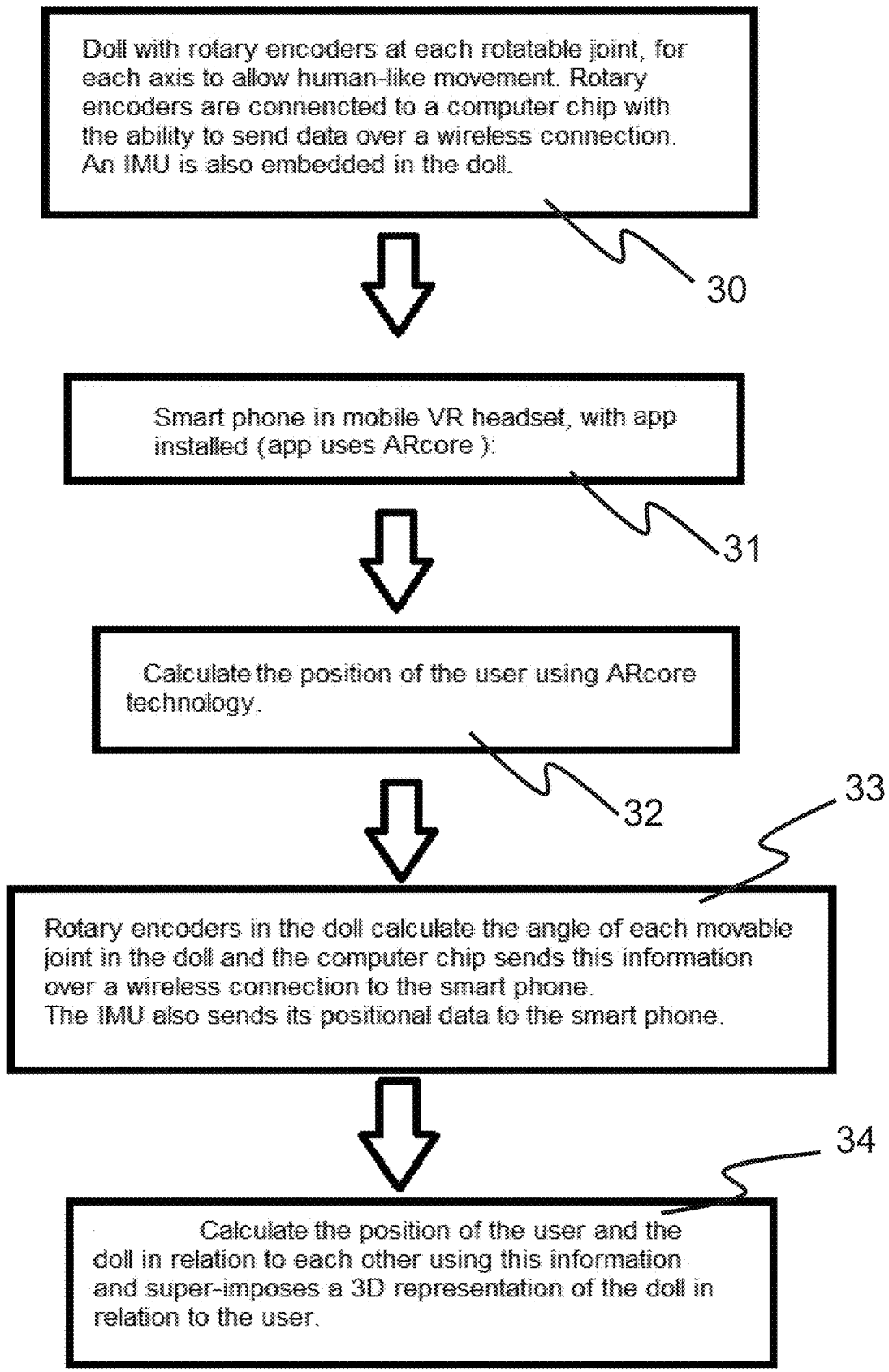
FIG. 3 shows a dataflow diagram of a system in accordance with an embodiment of the invention that employs rotary encoders.

Referring to FIG. 2, an inertial measurement unit (IMU) is embedded inside each movable part of the toy (20).

Each IMU will record the current angle and position of each movable part. This information is sent wirelessly, e.g. via Wi-Fi or Bluetooth to the app (21). The app will set the angle and position of the computer-generated overlays to correspond with the toy and its movable parts (22).

Calculate the position and pose of the doll via the IMUs and superimpose a 3D representation of the doll in relation to the user (23). For example, if the toy is 2 m in front from the user, the computer-generated overlay will appear 2 m in front of the user in virtual reality/augmented reality space. The IMUs will require a portable power source also embedded into the toy and will have an access point for charging.

A third aspect of the invention is achieved with Encoders.

Rotary encoders are used to store the angle of each movable part of the toy. In the case of the arm of a toy excavator a rotary encoder is embedded in each joint of the excavator's arm and will store the angle of each joint on a microcontroller (30). The rotary encoders are connected by wire to a microcontroller which will send the data from the movable joints to a computer or smartphone (31). Also embedded in the toy is a single IMU for positional tracking, and a portable power supply with an access point for charging. The IMU will send positional information to a computer or smartphone where the app will calculate the pose of the entire toy (32) using the skeleton data and positional data, and display the computer generated overlay for the toy in virtual reality/augmented reality space for the user (33).

The system is open to accept a large number of encoders and computer boards they may be needed, or if the IMU will need to be connected.

Possibly microcontrollers/Arduino boards may be employed.

A fourth aspect of the invention is named Post-processing.

This method is useful for making a toy look like a cartoon. The toy will need to be physically extremely similar to the target cartoon. Each movable part of the toy is a different colour. If two segments are directly connected, for example the loader and the arm of a toy excavator, there is a strip of additional colour between them (in this case, at the joint). This additional colour is the same between every directly connected segment. the app uses the smartphone's camera feed to detect when two different colours are next to each other. If two different colours are next to each other, and neither of them is the "additional colour", then a black outline is drawn between them. All colours not including the background and outlines is replaced with the corresponding cartoon colour.

There are two aims to this system.

1: To add computer generated effects like fire to a toy to make it seem more realistic. For example, instead of a toy soldier having a plastic moulded muzzle flash it can have a computer-generated muzzle flash.

2: To make the toy more like the object they are meant to represent with computer graphics. For example, a plastic toy soldier can become a realistic-looking computer generated soldier who blinks and breaths. In another example, a toy that is meant to be the likeness of a cartoon character from television can match the show's cartoon art style much more closely when it is overlaid with computer graphics.

2. Adult Doll

A further embodiment of the invention may be for example for enhancing adults' interactions with a sex doll.

A sex doll is modified or added on to with the goal of being overlaid with a humanoid 3D computer generated model in a virtual reality (VR) or augmented reality (AR) environment. The overlay model is so closely aligned with the physical doll that the user is able to feel the sensation of touching the overlay model. Essentially the overlay doll will occupy the same space in the VR/AR environment that the physical doll does in the real world.

A fifth aspect of the invention is achieved with optical markers. This is similar to the first aspect of the invention.

Referring again to FIG. 1, various markers with different appearances or colours is attached to the doll to denote each body part. The VR headset can be a smartphone-based VR headset with embedded cameras with which to acquire the optical markers on the toy (10). Other types of VR headset may also be used. A smart device application (App) is installed on the smartphone (11). The smartphone app will display the overlay model and use the camera feed to perform calculations for positioning the overlay model into the same space as the doll (12). Each limb of the doll will have different markers. When the smartphone's camera detects a marker denoting the right arm the smartphone app will position the overlay model's right arm into the position of the doll's right arm. Calculations are done with the angle of the marker and the distance it is from the camera to achieve this positioning. This is done with every marker detected on the camera feed to position each corresponding limb of the overlay model. Calculate the position and pose of the toy and superimpose a 3D representation of the doll in relation to the user (13).

For example, if the doll's right arm is 2 m from the camera and at a 30-degree angle, then the overlay model's right arm is positioned at 2 m from the user and at a 30-degree angle in virtual reality/augmented reality space.

A sixth aspect of the invention is achieved with inertial measurement unit (IMU).

Referring to FIG. 2, an inertial measurement unit (IMU) is embedded inside each limb or movable part of the doll (20).

Each IMU will record the current angle and position of limb or movable part e.g. via Wi-Fi or Bluetooth to the app (21).

The visual features of a human model have been previously acquired and are in a library of the software, i.e. the app.

The app will set the angle and position of the computer-generated overlays to correspond with the toy and its movable parts (22).

The app will set the angle and position of the overlay model's limbs to be the same as the doll. Calculate the position and pose of the doll via the IMUs and superimpose a 3D representation of the doll in relation to the user (23). For example, if the doll is 2 m in front from the user, the overlay model will appear 2 m in front of the user in virtual reality/augmented reality space. The IMUs comprises a portable power source also embedded into the doll and will have an access point for charging. Various setups of IMU, power and Wi-Fi or wireless system may be used.

A seventh aspect of the invention is achieved with Encoders similar to the third aspect.

A humanoid skeleton is made from thin metal rods for the bones, and rotary encoders for the joints. In the case of the shoulder joint (where the arm's movement can move up and down as well as side to side) two rotary encoders can be joined in close proximity to determine both horizontal and vertical rotation of the joint. In the case of single direction joints like the knees, only one rotary encoder is needed for the joint. The whole system of rotary encoders and metal rods is the size of the doll's skeleton. The doll's silicone is moulded around the skeleton to embed the skeleton inside the doll. The rotary encoders are connected by wire to a computer board which will send the data from the skeleton to a computer or smartphone. Also embedded in the doll are an IMU for positional tracking, and a portable power supply with an access point for charging. The IMU will send positional information to a computer or smartphone where the app will calculate the pose of the entire doll using the skeleton data and positional data, and display the resulting overlay model in virtual reality/augmented reality space for the user.

An eighth aspect of the invention is similar to the fourth aspect named Post-processing.

This method is most useful for making the doll appear as a cartoon with simple colours and outlines. The doll will need to be physically extremely similar to the target overlay model. Each limb of the doll is a different colour.

The different colour segments are: Left forearms, left upper arms, Left hand, Right forearms, Right upper arms, Right hand. Left upper legs, left lower legs, left foot, right upper legs, right lower legs, Right foot, Head, Neck, left breast, Right breast, Abdominal area, Chest area, Pelvic area and Each phalanx of each finger and toe will all have separate colours. If two segments are directly connected, for example the right forearm and right upper arm, there is a strip of additional colour between them (in this case, at the elbow). This additional colour is the same between every segment. the app uses the smartphone's camera feed to detect when two different colours are next to each other. If two different colours are next to each other, and neither of them is the "additional colour", then a black outline is drawn between them. This will produce the cartoon-style black outline around the cartoon. All colours not including the background and outlines is replaced with cartoon skin tone.

The doll's silicone may be dyed before casting it solid or the colouring might be applied to the doll after casting.

A ninth aspect of the invention is achieved with Chroma Key method.

This method is most useful for making the doll appear as a cartoon with simple colours and outlines. The doll is coloured with one solid "chroma key" colour and the user's smartphone will apply a post-process to the camera feed to replace that colour with cartoon skin tone. The doll will need to be brightly illuminated by a light mounted to the VR headset. This will give the "chroma key" colour an even lighting which will fall off near the edges of the doll. This dimming near the edges will produce a vague outline so that the user can tell the shape of the doll, or for example when the dolls arm passes in front of its torso.

Figure 4:
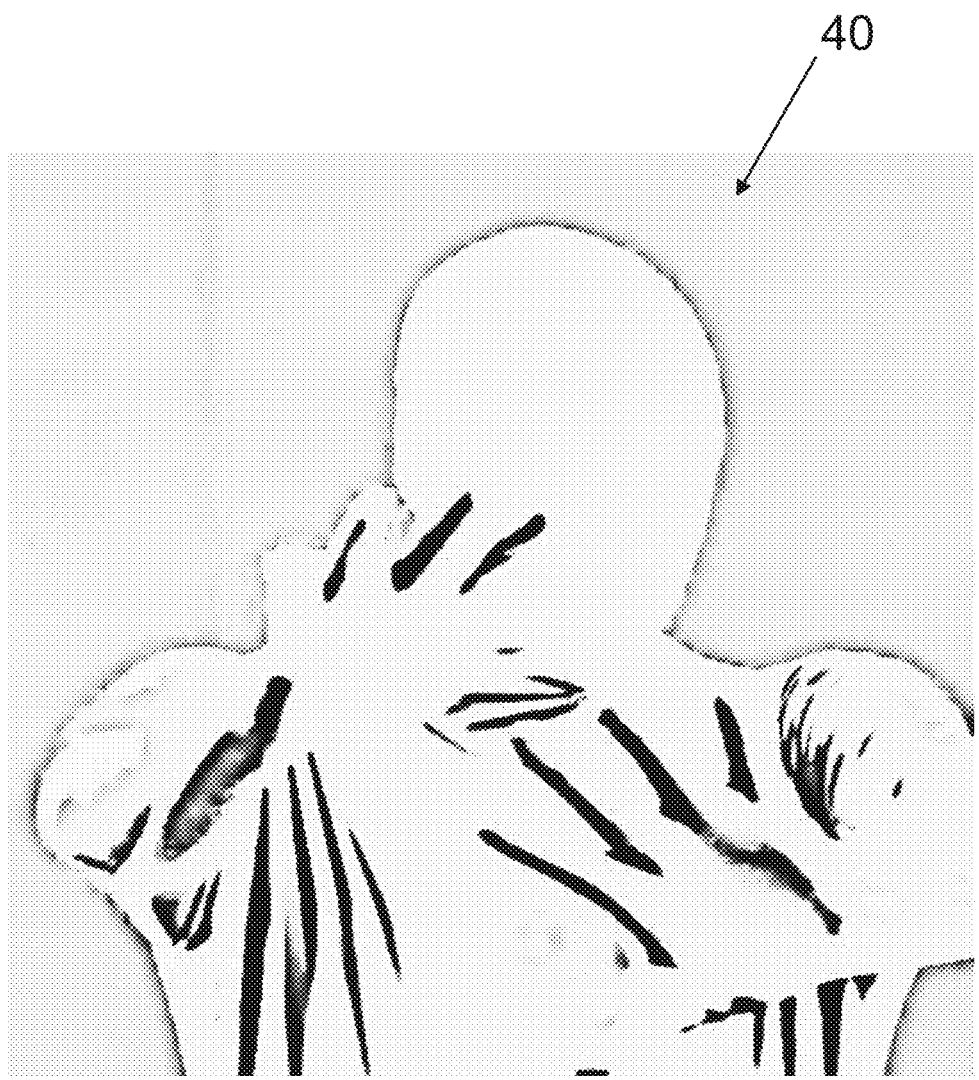
FIG. 4 illustrates the use of a chroma key suit in the invention.

FIG. 4 is a similar example of a person in a "chroma key" suit (40). The shadows around the fingers show where the hand is in front of the wearer. Usually the wearer of a chroma key suit would want even lighting all around them to remove all shadows, but for this solution the lighting needs to be placed in front of the doll (mounted on the VR headset) to produce these shadows so that the user can still tell the shape of the doll in cases like this.

In most of these methods there will also be a way of determining the position of the doll's face. This could be done with an IMU or a visual marker. This will allow a face with moving features like blinking to be overlaid on the doll.

3. A Bodysuit

A further embodiment of the invention proposes a bodysuit. There are two main users for this product: A "wearer" and a "viewer".

A silicone body suit is modified or added on to with the goal of being overlaid with a humanoid 3D computer generated model in a virtual reality (VR) or augmented reality (AR) environment. The wearer will wear the suit while the viewer uses a smartphone VR headset to view the overlay model. The overlay model is so closely aligned with the wearer of the suit that the viewer with a smartphone VR headset is able to feel the sensation of touching the overlay model, while the overlay model is controlled by the wearer. Essentially the overlay model will occupy the same space in the VR/AR environment that the wearer does in the real world.

Method 1: (Optical marker method)—Various markers with different appearances or colours is attached to the body suit to denote each body part. The VR headset will need to be a smartphone VR headset because they have cameras with which to see the optical markers on the suit. The app will need to be installed on the smartphone. The smartphone app will display the overlay model and use the camera feed to perform calculations for positioning the overlay model into the same space as the suit. Each limb of the suit will have different markers. When the smartphone's camera detects a marker denoting the right arm the smartphone app will position the overlay model's right arm into the position of the suit's right arm. Calculations is done with the angle of the marker and the distance it is from the camera to achieve this positioning. This is done with every marker detected on the camera feed to position each corresponding limb of the overlay model. For example, if the suit's right arm is 2 m from the camera and at a 30-degree angle, then the overlay model's right arm is positioned at 2 m from the viewer and at a 30-degree angle in virtual reality/augmented reality space.

The app also displays the overlay model. Different types of markers with various appearances may be employed. The app also does the calculations.

Method 2: (Post-processing)—This method is most useful for making the wearer appear as a cartoon with simple colours and outlines. The wearer of the suit should be physically extremely similar to the target overlay model. Each limb of the suit is a different colour. The different colour segments are: Left forearms, left upper arms, Left hand, Right forearms, Right upper arms, Right hand. Left upper legs, left lower legs, left foot, right upper legs, right lower legs, Right foot, Head, Neck, left breast, Right breast, Abdominal area, Chest area, Pelvic area and Each phalanx of each finger and toe will all have separate colours. If two segments are directly connected, for example the right forearm and right upper arm, there is a strip of additional colour between them (in this case, at the elbow). This additional colour is the same between every segment. the app uses the smartphone's camera feed to detect when two different colours are next to each other. If two different colours are next to each other, and neither of them is the "additional colour", then a black outline is drawn between them. This will produce the cartoon-style black outline around the cartoon. All colours not including the background and outlines is replaced with cartoon skin tone.

The body suit's silicone may be dyed before casting it solid or the colouring might be applied to the body suit after casting.

Method 3: (Chroma Key method)—This method is most useful for making the wearer appear as a cartoon with simple colours and outlines. The suit is coloured with one solid "chroma key" colour and the viewer's smartphone will apply a post-process to the camera feed to replace that colour with cartoon skin tone. The wearer of the suit will need to be brightly illuminated by a light mounted to the viewer's VR headset. This will give the "chroma key" colour an even lighting which will fall off near the edges of the suit. This dimming near the edges will produce a vague outline so that the viewer can tell the shape of the wearer, or for example when the wearer's arm passes in front of its torso FIG. 4 is a similar example of a person in a "chroma key" suit (40). The shadows around the fingers show where the hand is in front of the wearer. Usually the user of a chroma key suit would want even lighting all around them to remove all shadows, but for this solution the lighting needs to be placed in front of the wearer (mounted on the VR headset) to produce these shadows so that the viewer can still tell the shape of the wearer in cases like this.

In most of these methods there will also be a way of determining the position of the doll's face. This could most easily be done with visual markers. This will allow a face with moving features like blinking to be overlaid on the doll. Possibly an existing solution for "facial motion capture" could be used.

The invention claimed is:

1. A system for augmenting the visual representation of an object with a different overlaid visualization in a seamless lifelike manner, comprising:
    means arranged to provide information on the location and motion of each movable part of the object;
    a camera arranged to acquire images and video of the object;
    position processing means arranged to calculate three dimensional distance and position of the movable parts and of the object;
    image processing means arranged to generate an overlay image into the same space as the object;
    display means to display the overlaid image;
    wherein the camera, position processing means, image processing means, and display means are all part of a smartphone based Virtual Reality headset unit worn by a user;
    a smart device application, App, is installed on the smartphone;
    the smartphone App displays a computer-generated overlay and uses the image acquired by the camera to perform calculations for positioning the computer-generated overlay into the same space as the object;
    wherein the computer-generated overlay is closely aligned with the object that the user is able to feel the sensation of touching the object, while the object is controlled by the wearer or user;
    wherein the object is covered in a bodysuit and the bodysuit is arranged to be wearable for a human; or
    wherein the object is a toy or an adults' doll.

2. The system of claim 1, wherein the means arranged to provide information on the location and motion of each movable part of the object are markers with different appearances or colors to each movable part of the object;
    wherein image acquisition means arranged to acquire images and video of the object with markers.

3. The system of claim 1, wherein the means arranged to provide information on the location and motion of each movable part of the object are inertial measurement units embedded inside each movable part of the object;
    wherein the image acquisition means are arranged to acquire images and video of the object and of its movable parts.

4. The system of claim 1, wherein the means arranged to provide information on the location and motion of each movable part of the object are rotary encoders arranged to acquire the angle of each movable part embedded inside each movable part of the object;
    wherein the image acquisition means are arranged to acquire images and video of the object and of its movable parts.

5. The system of claim 1, wherein the means arranged to provide information on the location and motion of each movable part of the object are based on chroma key methodology,
    wherein the image acquisition means are arranged to acquire images and video of the object and of its movable parts;
    and the image is post-processed to replace a particular color with a predefined visual feature.

* * * * *